(12) United States Patent
Nomura (10) Patent No.: US 7,870,348 B2
(45) Date of Patent: Jan. 11, 2011

(54) PROCESSING DEVICE

(75) Inventor: Shuou Nomura, Kamagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 596 days.

(21) Appl. No.: 11/691,046

(22) Filed: Mar. 26, 2007

(65) Prior Publication Data

US 2007/0233974 A1 Oct. 4, 2007

(30) Foreign Application Priority Data

Mar. 28, 2006 (JP) .............................. 2006-087434

(51) Int. Cl.
*G06F 12/00* (2006.01)
(52) U.S. Cl. ...................................... 711/154; 711/100
(58) Field of Classification Search .................. 711/154, 711/100
See application file for complete search history.

(56) References Cited

U.S. PATENT DOCUMENTS

| 5,155,816 | A | | 10/1992 | Kohn |
| 6,052,756 | A | * | 4/2000 | Barnaby et al. ............. 711/105 |
| 6,263,413 | B1 | * | 7/2001 | Motomura et al. .......... 711/173 |
| 6,282,631 | B1 | | 8/2001 | Arbel |
| 7,353,334 | B2 | * | 4/2008 | Horn et al. .................. 711/113 |
| 7,562,198 | B2 | * | 7/2009 | Noda et al. ................. 711/154 |

* cited by examiner

*Primary Examiner*—Stephen C Elmore
(74) *Attorney, Agent, or Firm*—Turocy & Watson, LLP (57) ABSTRACT

A processing device disclosed herein comprises: a memory access circuit which accesses a memory and sequentially reads data from the memory based on a predetermined access pattern; storage in which the data read by the memory access circuit is stored, wherein the memory access circuit sequentially reads the data from the memory and stores the data in storage until storage is full; and a processor which acquires the data from storage.

11 Claims, 7 Drawing Sheets

ONE-DIMENSIONAL SLIDE ACCESS

FIG. 5

TWO-DIMENSIONAL SLIDE ACCESS

PROCESSING DEVICE

CROSS REFERENCE TO RELATED APPLICATIONS

This application claims benefit of priority under 35 U.S.C. §119 to Japanese Patent Application No. 2006-087434, filed on Mar. 28, 2006, the entire contents of which are incorporated by reference herein.

BACKGROUND OF THE INVENTION

1. Field of the Invention

The present invention relates to a processing device, and particularly relates to a processing device which processes a large quantity of data.

2. Related Background Art

When a stream of data such as audio data or video data is reproduced, media streaming is performed, and this media streaming has a characteristic of performing a limited small number of processings on a large quantity of data rather than repeatedly performing a plurality of processings on one piece of data.

When such data streaming is performed by a processor, (1) data loading, (2) operation, and (3) pointer increment are repeated. In a dedicated processor such as a DSP, a dedicated instruction set for this processing is provided, and this processing can be performed by one instruction. However, if this processing is performed by a processing device such as a general-purpose RISC processor, three or more instructions are needed. For example, a program to find a total sum of stream data by the general-purpose RISC processor is shown as follows:

```
int totalsum(int *streamData, int dataNum)
{
int i;
    _R1=0
    _R2=streamdata;
    for (i=0; i<dataNum; i++){
        _R3=*(_R2);
        _R1=_R1+_R3
        _R2=_R2+1
    }
    return(_R1);
}
```

The program exemplified here is a program of a function totalsum( ) to find the total sum of an array stream Data. dataNum represents the number of data of streamData. Further, R1, R2, and R3 represent registers, respectively. More specifically, R1 is a register in which the total sum is stored, R2 is a register in which a pointer indicating the position of the array streamData, and R3 is a register in which data loaded from streamData is stored.

In this program, data in the register R1 in which the total sum is to be stored is reset to zero. Then, the value of stream Data (namely, pointer) is stored in the register R2.

Next, as is known from instructions in a loop by a for sentence, (1) streamData in a position designated by _R2 in _R3=*(_R2) is loaded into the register R3. Then, (2) the loaded data in the register R3 is added to current data in the register R1 by _R1=_R1+_R3. Subsequently, (3) the value of the register R2 in which the pointer is stored is incremented by one.

Then, the above processing from (1) to (3) is repeatedly performed as long as the condition of the for sentence is satisfied, that is, the condition of i<dataNum is satisfied. More specifically, the above processing from (1) to (3) is repeated the number of times equal to the number of dataNum.

As can be seen from this example, if the data streaming is performed by the general-purpose RISC processor, three instructions of (1) data loading, (2) operation, and (3) pointer increment are repeated.

To reduce the number of such repeated instructions, it is conceivable to provide a dedicated instruction set such as in the DSP also in the general-purpose RISC processor, but if the complicated instruction set is implemented, there arises a problem that the circuit scale of the RISC processor increases.

There is a possibility that such a problem arises not only in data streaming but also in every data processing of repeatedly performing the same processing on large data.

Further, to solve a similar problem, in U.S. Pat. No. 5,155,816, a floating-point load instruction PFload of a line different from that of a normal load instruction is provided, and to reduce a mismatch between the supply of data by the PFload instruction and data processing, data obtained by the PFload instruction are stored in a FIFO buffer and sequentially outputted. Further, in U.S. Pat. No. 6,282,631, the FIFO buffer is mapped in a memory space, and this FIFO buffer is used to sequentially read a bit stream to be decoded. In both of these documents, the FIFO buffer is used to hide the latency of memory access, but the latency improving effect is not necessarily sufficient or an increase in circuit scale is inevitable.

SUMMARY OF THE INVENTION

In order to accomplish the aforementioned and other objects, according to one aspect of the present invention, a processing device comprises:

a memory access circuit which accesses a memory and sequentially reads data from the memory based on a predetermined access pattern;

storage in which the data read by the memory access circuit is stored, wherein the memory access circuit sequentially reads the data from the memory and stores the data in storage until storage is full; and a processor which acquires the data from storage.

According to another aspect of the present invention, a control method of a processing device comprises:

accessing a memory and sequentially reading data from the memory based on a predetermined access pattern;

sequentially storing the data read from the memory in storage until storage is full; and acquiring the data from storage by a processor.

DETAILED DESCRIPTION OF THE EMBODIMENTS

In the present embodiment, by using a characteristic that the access pattern to stream data has predetermined regularity, faster streaming is realized while an increase in circuit scale is kept to a minimum. A more detailed description will be given below.

Figure 1:
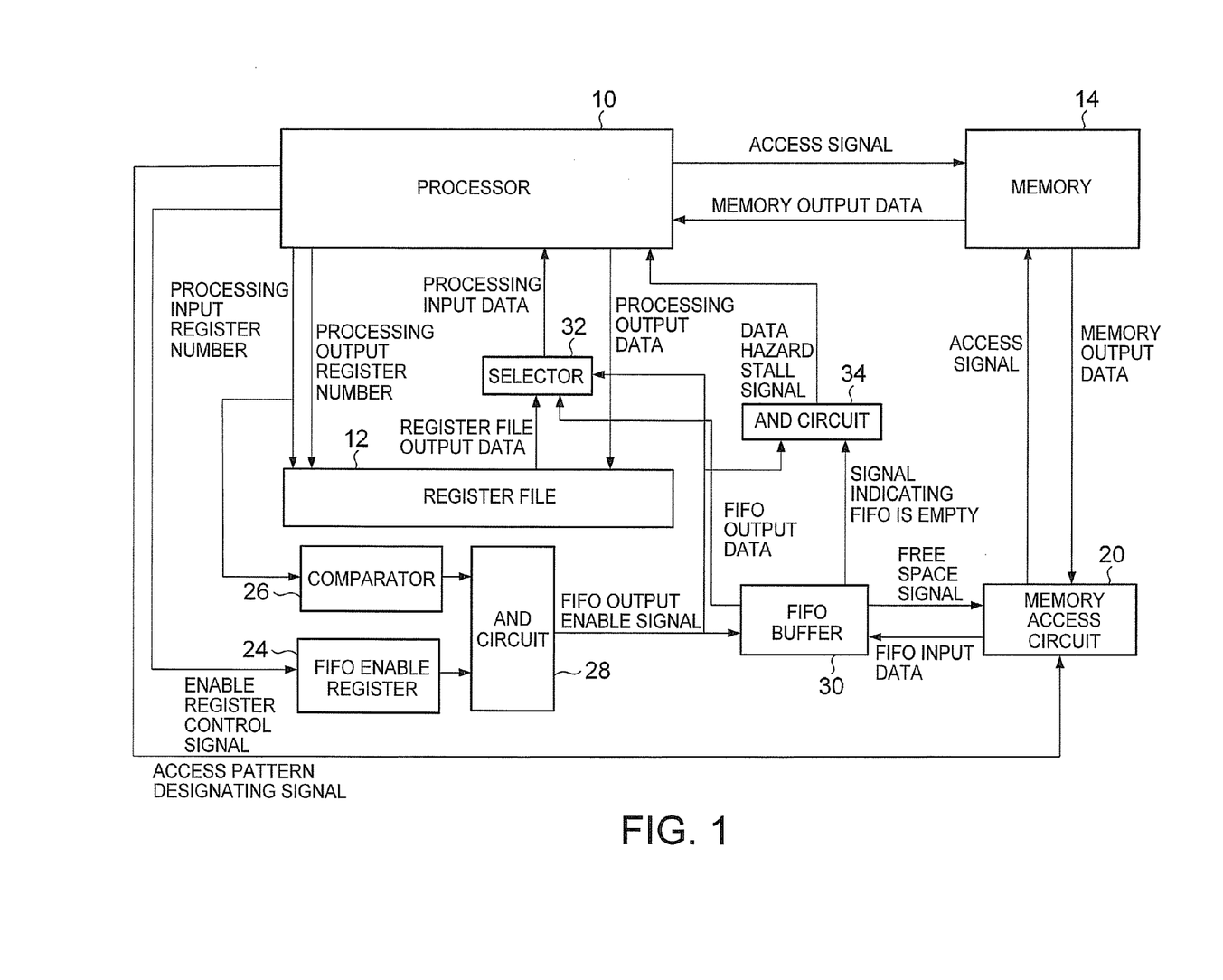
FIG. 1 is a block diagram for explaining an example of the internal configuration of a processing device according to the present embodiment.

FIG. 1 is a block diagram for explaining an example of the internal configuration of a processing device according to the present embodiment. Based on FIG. 1, the operation of the processing device when the above processing of finding the total sum of stream data is performed will be described.

As shown in FIG. 1, the processing device according to the present embodiment includes a processor 10, a register file 12, a memory 14, a memory access circuit 20, a FIFO enable register 24, a comparator 26, an AND circuit 28, a FIFO buffer 30, a selector 32, and an AND circuit 34.

In the present embodiment, the respective constituent elements shown in FIG. 1 are formed on one chip as one integrated circuit, but their constitutional form is optional. For example, the memory 14 need not be included in this processing device and may be formed as another chip.

First, the memory access circuit 20 is activated based on an access pattern designating signal being an activation control signal in the present embodiment. When the memory access circuit 20 is activated, the memory access circuit 20 accesses the memory 14, reads data of streamData, and stores it in the FIFO buffer 30, and repeats this process until there is no space in the FIFO buffer 30. The present embodiment assumes a regularity for sequentially reading out data from the beginning of streamData. This FIFO buffer 30 forms storage in the present embodiment.

More specifically, the memory access circuit 20 outputs an access signal to the memory 14. Since an access signal is also inputted to the memory 14 from the processor 10 in some cases, the memory 14 also arbitrates these access from the memory access circuit 20 and access from the processor 10. Various orders of priority are conceivable when two accesses compete, and, for example, algorithms of giving priority to the access from the processor 10 and giving priority to the access from the memory access circuit 20 are conceivable.

In the present embodiment, an address in the memory 14 to be accessed is included in the access signal, and therefore the memory 14 reads data at the designated address and outputs it as memory output data to the memory access circuit 20 or the processor 10.

Figure 2:
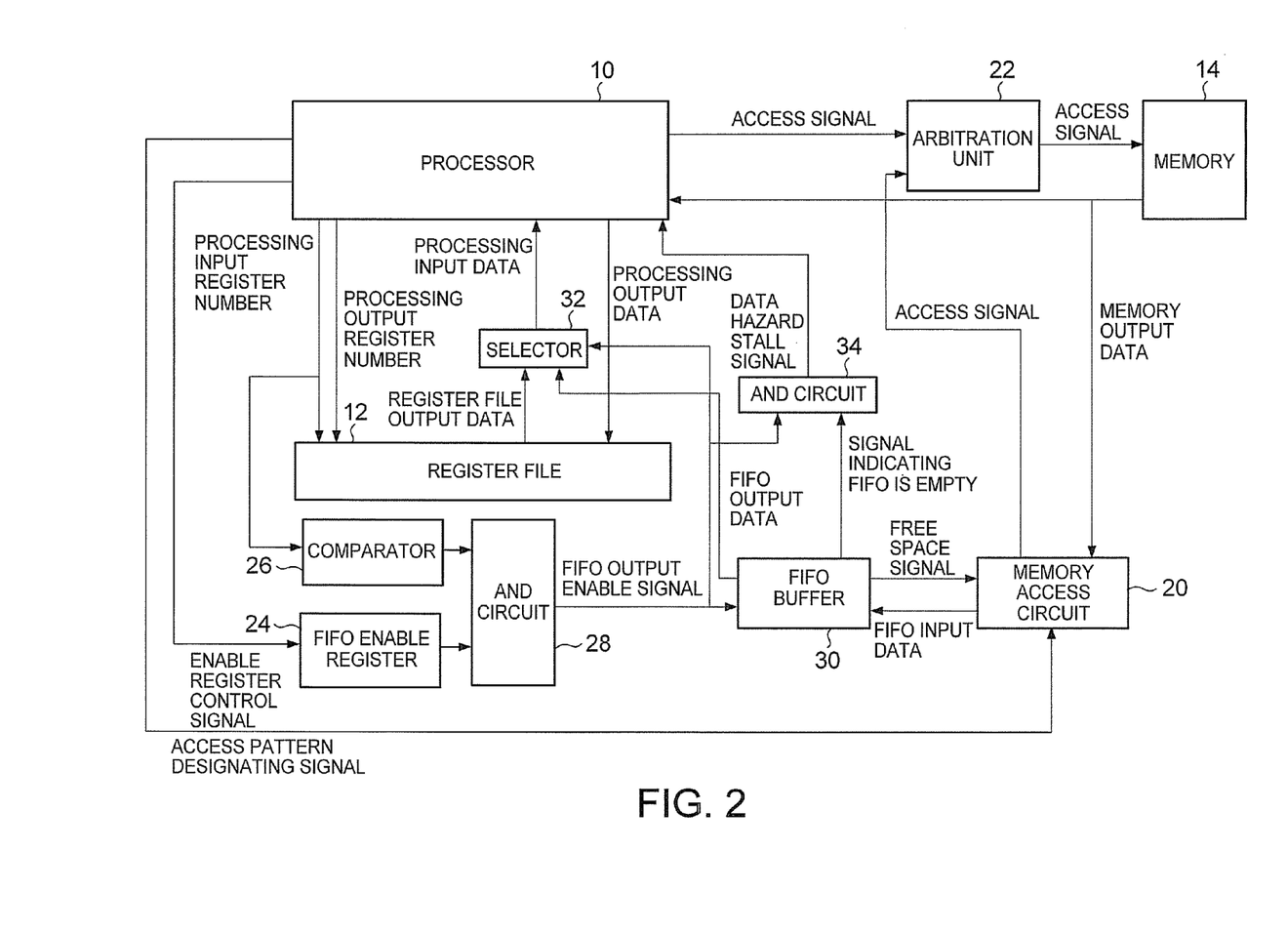
FIG. 2 is a diagram for explaining a modified example of the internal configuration of the processing device.

Incidentally, in the example of FIG. 1, the memory 14 has an arbitration function when the access signal from the processor 10 and the access signal from the memory access circuit 20 compete, but if the memory 14 does not have such an arbitration function, as shown in FIG. 2, an arbitration unit 22 is provided separately from the memory 14, and the processor 10 and the memory access 20 are only required to access the memory 14 via this arbitration unit 22.

As shown in FIG. 1, the memory access circuit 20, which has acquired the memory output data outputted from the memory 14, outputs it as FIFO input data to the FIFO buffer 30 and stores it as read data (streamData) in the FIFO buffer 30. This streamData includes dataNum arrays and, if there is a space area in the FIFO buffer 30, the memory access circuit 20 sequentially reads streamData from the memory 14 and stores it in the FIFO buffer 30.

The memory access circuit 20 determines based on a free space signal outputted by the FIFO buffer 30 whether there is the space area in the FIFO buffer 30.

On the other hand, if a register, from which data needs to be read, occurs, the processor 10 outputs its register number as a processing input register number to the register file 12. The register file 12 outputs data in the register with a number designated by the processing input register number as register file output data to the selector 32.

Moreover, the processing input register number outputted from the processor 10 is also inputted to the comparator 26. In the present embodiment, a register number in which data prefetched from the memory 14 is stored is defined as No. 15. Therefore, the comparator 26 determines whether the inputted processing input register number is No. 15, and outputs a high-level comparison result signal if the inputted processing input register number is No. 15, whereas it outputs a low-level comparison result signal if the inputted processing input register signal is not No. 15.

Further, when performing processing using the FIFO buffer 30 for prefetch by activating the memory access circuit 20, prior to this processing, the processor 10 outputs a high-level enable register control signal to the FIFO enable register 24. Hence, when the processing, using the FIFO buffer 30 for prefetch, is being performed, an output signal of the FIFO enable register 24 is high. This output signal of the FIFO enable register 24 and the comparison result signal of the comparator 26 are inputted to the AND circuit 28.

Accordingly, a FIFO output enable signal as an output of the AND circuit 28 goes high when the processing input register number of No. 15 is outputted from the processor 10 while the processing using the FIFO buffer 30 for prefetch is being performed.

When this high-level FIFO output enable signal is inputted to the FIFO buffer 30, the FIFO buffer 30 outputs held data as FIFO output data to the selector 32 in the order in which they are stored. Then, the FIFO buffer 30 clears outputted data and outputs the free space signal to the memory access circuit 20 to receive next data. The FIFO output enable signal switches from low to high every time the processor 10 outputs the processing input register number of No. 15, and hence the FIFO buffer 30 outputs data stored at the very first as the FIFO output data every time the FIFO output enable signal switches from low to high.

As can be seen from the above, the register file output data from the register file 12 and the FIFO output data from the FIFO buffer 30 are inputted to the selector 32, and additionally the FIFO output enable signal from the AND circuit 28 is also inputted thereto. Based on this FIFO output enable signal, the selector 32 outputs either one of the register file output data or the FIFO output data as processing input data to the processor 10.

More specifically, if the FIFO output enable signal is high, the FIFO output data is outputted as the processing input data to the processor 10, and if the FIFO output enable signal is low, the register file output data is outputted as the processing input data to the processor 10. Thus, when performing the processing using the FIFO buffer 30 for prefetch by activating the memory access circuit 20, the processor 10 can acquire data prefetched and stored in the FIFO buffer 30 as a register 15. On the other hand, when performing normal processing, the processor 10 can acquire data of the register 15 stored in the register file 12.

The AND circuit 34 is provided to put off instruction execution of the processor 10 when the prefetched data is not stored in the FIFO buffer 30. Namely, a signal indicating that the FIFO buffer 30 is empty, which is outputted from the FIFO buffer 30, and the FIFO output enable signal outputted from the AND circuit 28 are inputted to the AND circuit 34. The signal indicating that the FIFO buffer 30 is empty is a signal which goes high when the FIFO buffer 30 is empty. Accordingly, if the FIFO buffer 30 becomes empty when the FIFO output enable signal is high (that is, when the processor 10 performs the reading from the register 15 while the prefetch processing using the FIFO buffer 30 by activating the memory access circuit 20 is being performed), the AND circuit 34 outputs a high-level data hazard stall signal.

Since the FIFO buffer 30 for prefetch is empty when the data hazard stall signal is high, the processor 10 puts off the execution of the instruction. In contrast, when the data hazard stall signal is low, the processor 10 executes the execution based on the prefetched data as described above.

Incidentally, when data is written into a register of the register file 12, the processor 10 outputs the number of the register into which the data is to be written as a processing output register number to the register file 12 and outputs data to be written as processing output data to the register file 12.

In the present embodiment, plural registers are provided in this register file 12, and register numbers are given to these plural registers, respectively. Therefore, the processor 10 can designate a register into/from which data is to be written/read by designating its register number.

Hereinafter, an example of a program to execute processing of finding the total sum of stream Data in the above processing device will be shown.

```
int totalsum_fifo(int *streamDATA, int dataNum)
{
int i;
_R1=0
enablefifo( );
prefetchfifo(streamdata, dataNum);
for (i=0; i<dataNum; i++){
    _R1=_R1+_R15;
}
disablefifo( )
return(_R1);
}
```

This program is a function with *stremData and dataNum as arguments and a function which returns the total sum of stream Data.

In this program, first, it is declared by int i that a variable i is an integer. Then, a register _R1 to store the total sum therein is initialized to zero by _R1=0. Subsequently, the above enable register control signal is enabled by enablefifo( ). Namely, the enable register control signal is switched from low to high.

Then, the memory access circuit 20 is brought into operation by prefetchfifo(streamdata, dataNum). More specifically, by the above access pattern designating signal, the memory access circuit 20 is activated, and also streamdata being the fetched data and dataNum being the number of data are designated as the arguments in the memory access circuit 20. In this streamdata, a first address of the memory 14 is designated. Consequently, the memory access circuit 20 starts processing of sequentially reading dataNum of data from the memory 14 at the address designated in streamData and sequentially storing them in the FIFO buffer 30.

Subsequently, processing of _R1=_R1+_R15 is repeated dataNum times by for (i=0; i<dataNum; i++) and _R1=_R1+ _R15. Namely, since streamData prefetched to the FIFO buffer 30 is sequentially stored in a register R15, this register _R15 is added to a resister _R1 which calculates the total sum.

After the processing of _R1=_R1+_R15 is repeated dataNum times, the enable register control signal is disabled by disablefifo( ) Namely, the enable register control signal is switched from high to low. Then, the calculated total sum is returned by the register _R1 by return(_R1).

Figure 3:
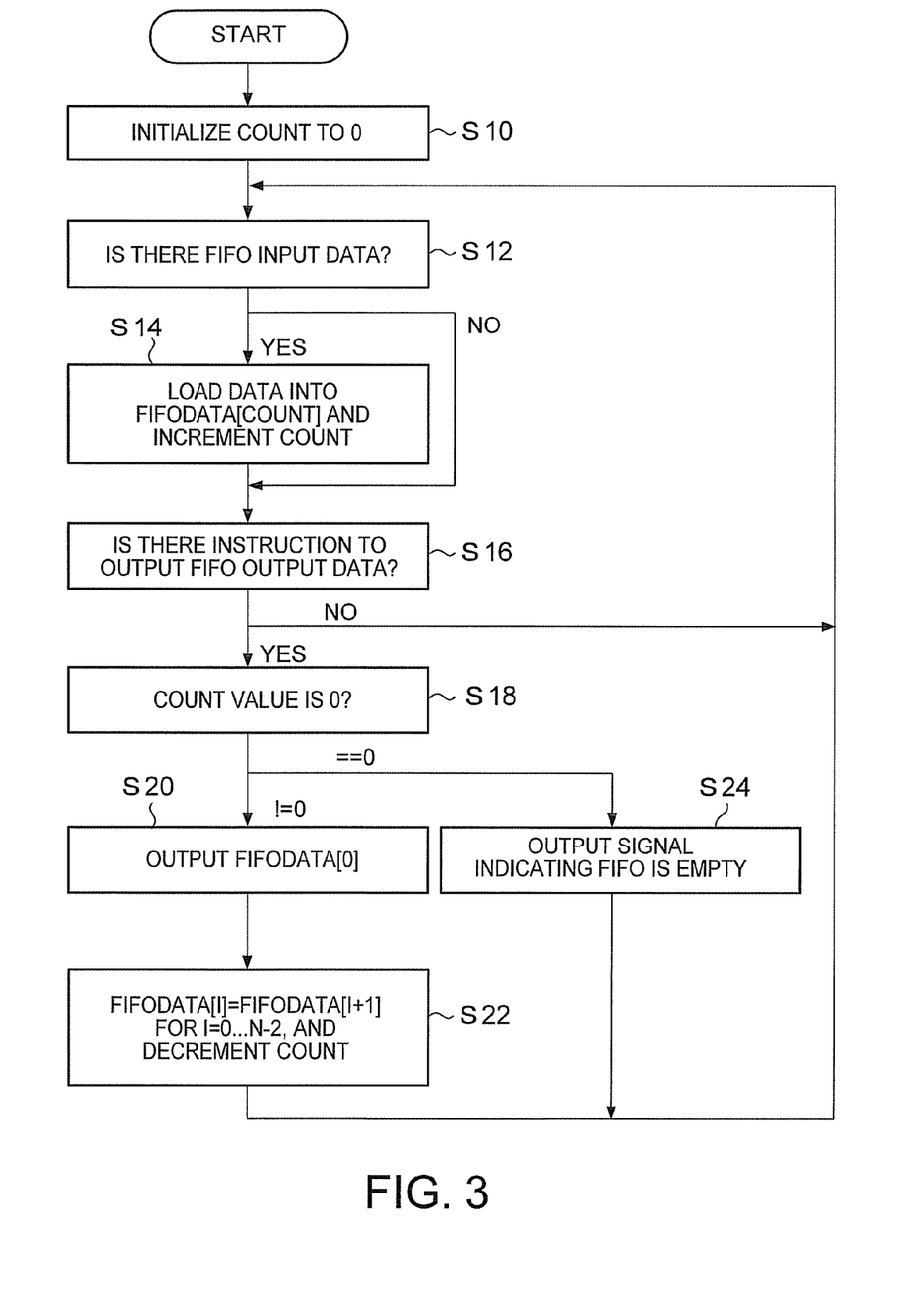
FIG. 3 is a flowchart for explaining an example of the contents of processing performed by a FIFO buffer in FIG. 1.

FIG. 3 is a flowchart for explaining the processing contents of the FIFO buffer 30. The processing shown in FIG. 3 is processing automatically started when power is supplied to this processing device.

As shown in FIG. 3, the FIFO buffer 30 initializes the value of COUNT indicating the number of data in the FIFO buffer 30 to zero (step S10). It is assumed here that N arrays FIFO-DATA[0 ... N−1] to store data are provided, so that COUNT is an integer of any of 0 ... N−1. Moreover, the size of each of the arrays FIFODATA[0 ... N−1] is the same as the number of bits of a register of the register file 12 (that is, the same as the bit width of a general-purpose register).

Then, the FIFO buffer 30 checks whether there is the FIFO input data from the memory access circuit 20 (step S12).

If there is the FIFO input data from the memory access circuit 20, the FIFO buffer 30 stores the FIFO input data in FIFODATA[COUNT] and increments COUNT by one (step S14). On the other hand, if there is not the FIFO input data, this step S14 is bypassed.

Next, the FIFO buffer 30 checks whether there is an instruction to output the FIFO output data (step S16). More specifically, it checks whether the high-level FIFO output enable signal is inputted.

If there is no instruction to output the FIFO output data, the FIFO buffer 30 returns to step S12 described above. On the other hand, if there is the instruction to output the FIFO output data, the FIFO buffer 30 checks whether the value of COUNT is zero (step S18).

If the value of COUNT is not zero, the FIFO buffer 30 outputs the value of FIFODATA[0] as the FIFO output data to the selector 32 (step S20). Subsequently, the FIFO buffer 30 shifts the values of the arrays FIFODATA[1] to FIFODATA [N−1] by one in the direction of FIFODATA[0] and decrements COUNT by one (step S22). Namely, FIFODATA[i] =FIFODATA[i+1] holds for i=0 to i=N−2. The value of this COUNT is outputted to the memory access circuit 20. Namely, in the present embodiment, when the value of COUNT is smaller than N−1, the free space signal is outputted from the FIFO buffer 30 to the memory access circuit 20. Then, the FIFO buffer 30 returns to step S12.

In contrast, if the value of COUNT is zero in step S18, the FIFO buffer 30 outputs the signal indicating that FIFO is empty to the AND circuit 34 (step S24). Then, it returns to step S12 described above.

Figure 4:
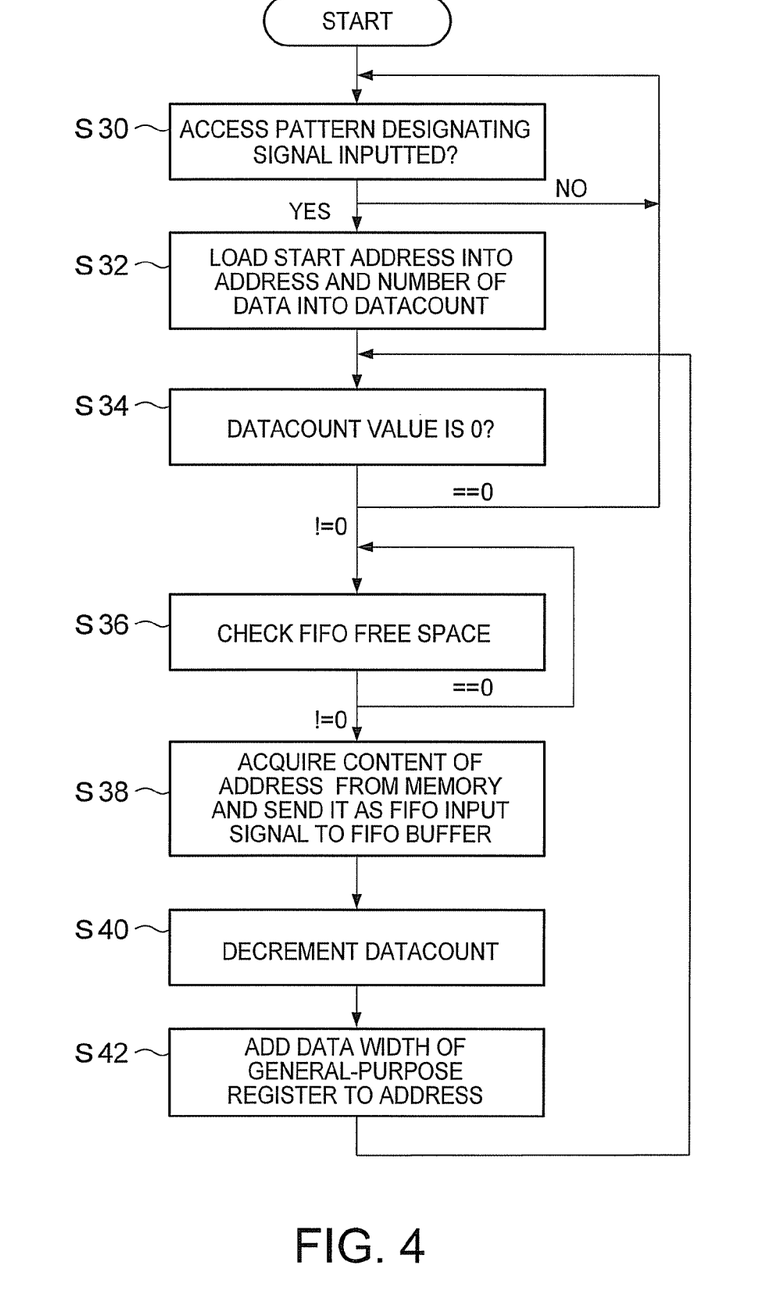
FIG. 4 is a flowchart for explaining an example of the contents of processing performed by a memory access circuit in FIG. 1.

FIG. 4 is a flowchart for explaining the processing contents of the memory access circuit 20. The processing shown in FIG. 4 is processing automatically started when power is supplied to this processing device.

As shown in FIG. 4, the memory access circuit 20 checks whether the access pattern designating signal from the processor 10 is inputted (step S30). Namely, since the processor 10 activates the memory access circuit 20 using the access pattern designating signal, it is checked whether this access pattern designating signal is inputted. If the access pattern designating signal is not inputted, the memory access circuit 20 stands by while repeating this step S30.

On the other hand, if the access pattern designating signal is inputted, the memory access circuit 20 loads a start address into ADDRESS and loads the number of data into DATA-COUNT (step S32). In the present invention, these start address and number of data are data included in the access pattern designating signal. When performing the prefetch using the memory access circuit 20, the processor 10 outputs the access pattern designating signal to the access circuit 20, and hence the memory access circuit 20 loads the start address and number of data included in the access pattern designating signal. In the above program, the start address is designated by streamData as the argument, and the number of data is designated by dataNum as the argument.

Then, the memory access circuit 20 checks whether the value of DATACOUNT is zero (step S34). If the value of DATACOUNT is zero, it means that the memory access circuit 20 has read all designated data from the memory 14 and sent them to the FIFO buffer 30, and hence the memory access circuit 20 returns to step S30 described above.

On the other hand, if the value of DATACOUNT is not zero, the memory access circuit 20 checks the free space of the FIFO buffer 30 (step S36). As described above, the free space of the FIFO buffer 30 can be confirmed by the value of COUNT outputted from the FIFO buffer 30. More specifically, if the value of COUNT is N−1, the free space of the FIFO buffer 30 is zero, and if the value of COUNT is N−2 or less, there is a free space in the FIFO buffer 30. When the free space of the FIFO buffer 30 is zero, the memory access circuit 20 repeats this step S36 and stands by until the free space appears in the FIFO buffer 30.

On the other hand, if the free space of the FIFO buffer 30 is not zero, the memory access circuit 20 acquires data at the address designated by ADDRESS from the memory 14 and sends it as the FIFO input data to the FIFO buffer 30 (step S38).

Then, the memory access circuit 20 decrements DATA-COUNT by one (step S40). Subsequently, the memory access circuit 20 adds a data width of the register in the register file to ADDRESS (step S42). Namely, ADDRESS comes to indicate the next data in the memory 14. Then, the memory access circuit 20 repeats the above process from step S34.

As described above, according to the processing device of the present embodiment, regarding data access such that the access pattern to the memory 14 is predetermined, the memory access circuit 20 prefetches data from the memory 14 in accordance with this access pattern and stores the data in the FIFO buffer 30, so that the processor 10 can acquire data at an address to be accessed at extremely high speed. Further, the processing device of the present embodiment can be realized without adding a large-scale circuit to a general-purpose processor, thereby enabling a reduction in the size of the processing device.

It should be mentioned that the present invention is not limited to the above embodiment, and various changes may be made therein. For example, in the above embodiment, the predetermined access pattern to the memory 14 is simple linear access, but this access pattern is not limited to the linear access, and the present invention is also applicable to a complicated access pattern such as a slide-type or a rectangular one as long as a predetermined pattern is provided. Further, the designation of a word length such as a byte, a half word, or a word and a data formatting manipulation such as shuffle can be performed by the memory access circuit 20. In this case, the memory access circuit 20 is only required to acquire necessary data from the memory 14, perform a designated manipulation, and then output the FIFO input data to the FIFO buffer 30.

Figure 5:
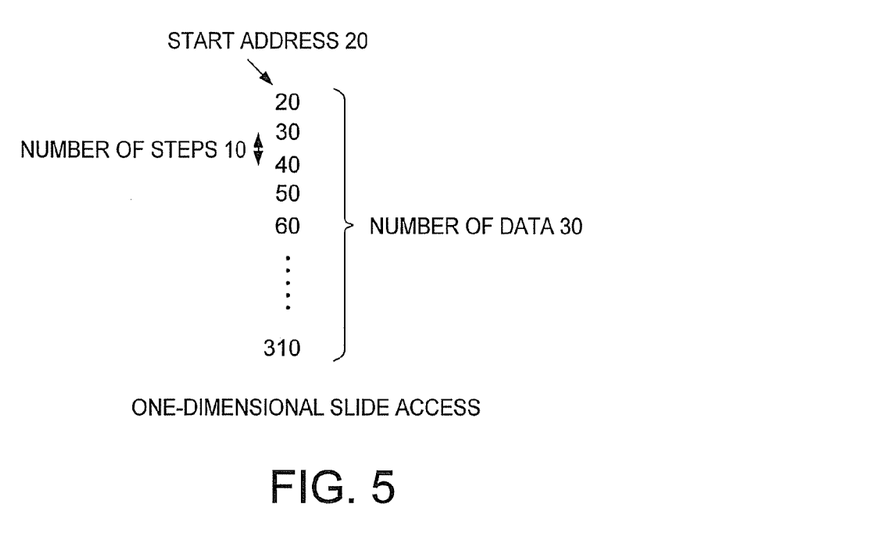
FIG. 5 is a diagram showing the contents of one-dimensional slide access as a modified example of a memory access pattern.

FIG. 5 is a diagram for explaining one-dimensional slide access as a modified example of the access pattern. As shown in FIG. 5, in the one-dimensional slide access, in the access pattern designating signal, in addition to the start address and the number of data, an address to be added in step S42 is also designated. In this example, the start address is "20", the number of data is "30", and the address to be added is "10". Therefore, ADDRESS starts from the start address "20", ADDRESS is incremented by "10" in step S42, and prefetch is repeated until ADDRESS finally reaches "310."

Figure 6:
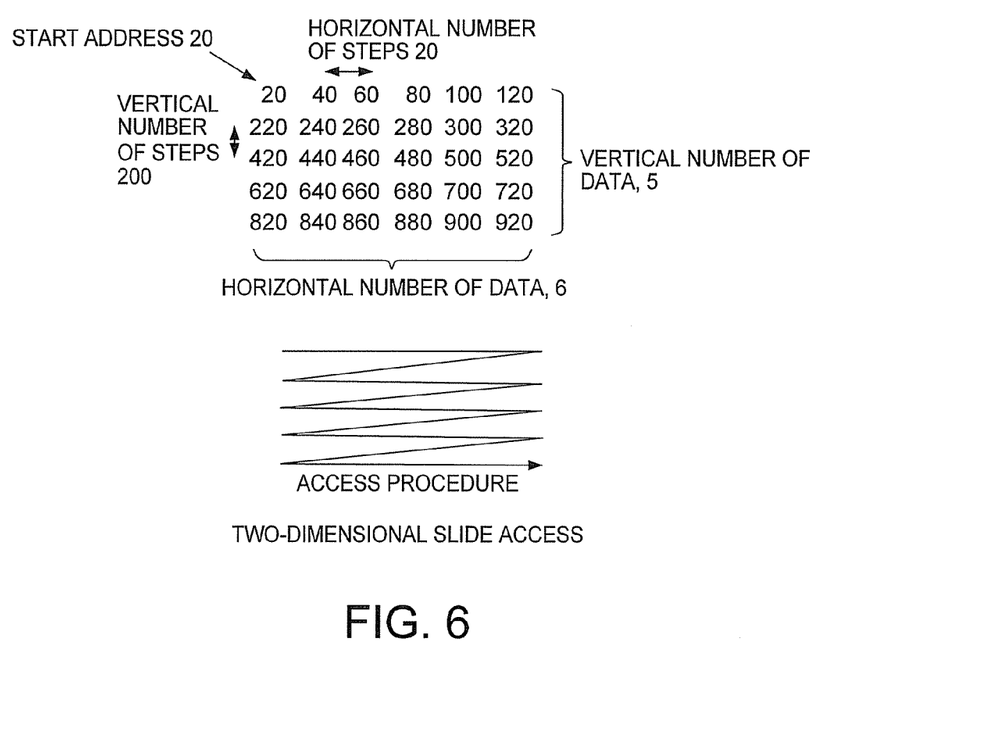
FIG. 6 is a diagram showing the contents of two-dimensional slide access as a modified example of the memory access pattern.

FIG. 6 is a diagram for explaining two-dimensional slide access as another modified example of the access pattern. As shown in FIG. 6, in the two-dimensional slide access, in the access pattern designating signal, in addition to the start address, the number of data in a horizontal direction, the size of an address in the horizontal direction to be added in step S42, the number of data in a vertical direction, and the size of an address in the vertical direction to be added in step S42 are designated.

In this example, the start address is "20", the number of data in the horizontal direction is "6", the size of the address (number of steps) to be added in the horizontal direction is "20", the number of data in the vertical direction is "5", and the size of the address (number of steps) to be added in the vertical direction is "200". Therefore, the processing in which ADDRESS starts from the start address "20" and increments by "20" steps in the horizontal direction, when ADDRESS reaches "6"th "120", "200" steps are added in the vertical direction, and ADDRESS increments by "20" steps again in the horizontal direction is repeated. This processing is repeated until a horizontally "6"th and vertically "5"th two-dimensional address is finally accessed. In the example in FIG. 6, the final address ADDRESS becomes "920".

Figure 7:
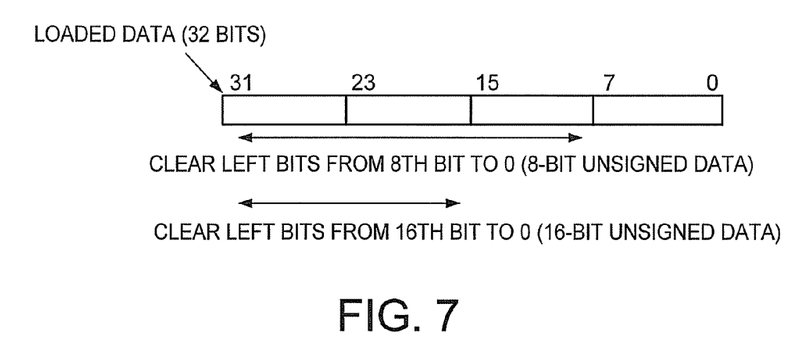
FIG. 7 is a diagram showing the contents of data manipulations on 8-bit unsigned data and 16-bit unsigned data as an example of a data formatting manipulation performed by the memory access circuit.
Figure 8:
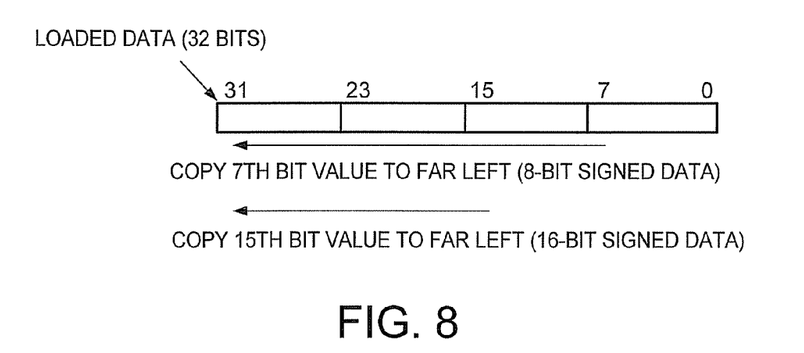
FIG. 8 is a diagram showing the contents of data manipulations on 8-bit signed data and 16-bit signed data as an example of the data formatting manipulation performed by the memory access circuit.

FIG. 7 and FIG. 8 are diagrams for explaining examples of a data formatting manipulation performed by the memory access circuit 20. In the examples in FIG. 7 and FIG. 8, it is assumed that the register width of the processor 10 is 32 bits.

As shown in FIG. 7, if the required data is 8-bit unsigned byte data, a manipulation of clearing the 8th bit to the 31st bit and leaving the 0th bit to the 7th bit is performed. On the other hand, if the required data is 16-bit unsigned half-word data, a manipulation of clearing the 16th bit to the 31st bit and leaving the 0th bit to the 15th bit is performed.

Further, as shown in FIG. 8, if the required data is 8-bit signed byte data, a manipulation of copying the value of the 7th bit to the 31st bit at the far left and further clearing the 8th bit to the 30th bit and leaving the 0th bit to the 6th bit is performed. On the other hand, if the required data is 16-bit signed half-word data, a manipulation of copying the value of the 15th bit to the 31st bit at the far left and further clearing the 16th bit to the 30th bit and leaving the 0th bit to the 14th bit is performed.

Figure 9:
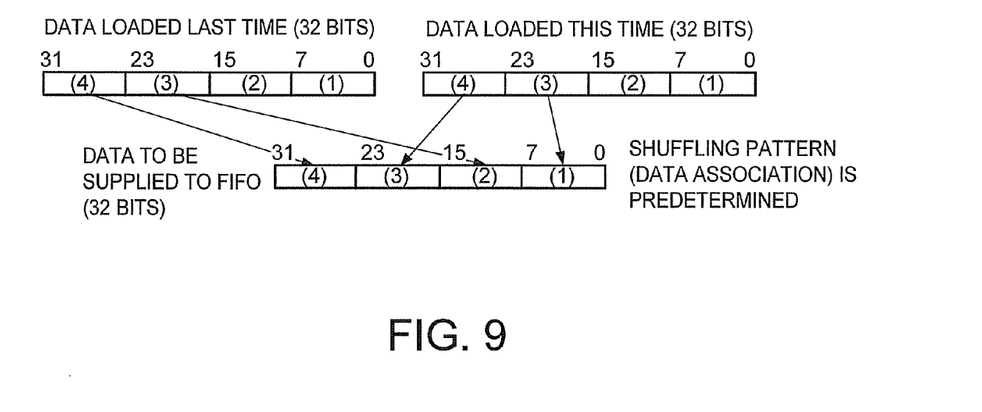
FIG. 9 is a diagram showing the contents of a data shuffling pattern as an example of the data formatting manipulation performed by the memory access circuit.

FIG. 9 is a diagram showing an example of a data shuffling pattern performed by the memory access circuit 20. In the example in FIG. 9, by shuffling 32-bit data loaded last time from the memory 14 and 32-bit data loaded this time from the memory 14, 32-bit FIFO input data is generated.

More specifically, by inserting the third byte of the data loaded this time into the first byte of the FIFO input data, inserting the third byte of the data loaded last time into the second byte of the FIFO input data, inserting the fourth byte of the data loaded this time into the third byte of the FIFO input data, and inserting the fourth byte of the data loaded last time into the fourth byte of the FIFO input data, the FIFO input data is generated. This association is predetermined and designated in the memory access circuit 20. When the memory access circuit 20 supports such plural data access patterns, it is only necessary to designate by which access pattern data prefetch from the memory 14 is performed using the access pattern designating signal outputted by the processor 10.

What is claimed is:

1. A processing device, comprising:
   a memory access circuit which accesses a memory and sequentially reads data from the memory based on a predetermined access pattern for sequentially accessing the memory in an order of address from a start address of the memory;
   a buffer in which the data read by the memory access circuit is stored, wherein the memory access circuit sequentially reads the data from the memory and stores the data in the buffer until the buffer is full; and
   a processor which acquires the data from the buffer.

2. The processing device according to claim 1, further comprising:
   a register file in which plural registers for the processor are provided, wherein register numbers are assigned to the registers respectively, and when the processor designates a register number, the register file outputs data of the resister of the designated register number; and
   a selector which selects either of the data outputted from the buffer or the data outputted from the register file and outputs the data selected to the processor.

3. The processing device according to claim 2, wherein the memory access circuit is activated by an activation control signal outputted from the processor.

4. The processing device according to claim 3, wherein when the register number designated by the processor matches a predetermined register number while the memory access circuit is active, the selector outputs the data outputted from the buffer to the processor.

5. The processing device according to claim 1, wherein the buffer is a buffer from which the data stored in the buffer are sequentially outputted in an order in which the data are stored.

6. The processing device according to claim 1, wherein the buffer outputs a signal indicating that the buffer is empty when no data is stored in the buffer, and
   the processor puts off an execution when the buffer outputs the signal indicating that the buffer is empty.

7. The processing device according to claim 1, wherein when a memory access from the memory access circuit to the memory and a memory access from the processor to the memory compete, the memory access is arbitrated in accordance with a predetermined algorithm.

8. The processing device according to claim 1, wherein the predetermined access pattern is to sequentially access an address incremented by a predetermined size of address from a start address of the memory.

9. The processing device according to claim 1, wherein the predetermined access pattern is to sequentially access an address incremented by a predetermined size of address in horizontal direction from a start address of the memory until the number of the increment reaches a predetermined value and then incremented by a predetermined size of address in vertical direction.

10. The processing device according to claim 1, wherein the memory access circuit manipulates the data read from the memory.

11. A control method of a processing device, comprising:
    accessing a memory and sequentially reading data from the memory based on a predetermined access pattern;
    sequentially storing the data read from the memory in the buffer until the buffer is full; and
    acquiring the data from the buffer by a processor.

* * * * *